(12) United States Patent
Schonfeld et al.

(10) Patent No.: US 9,031,328 B2
(45) Date of Patent: May 12, 2015

(54) LANDMARK TRIGGERED IMAGE AUGMENTATION

(71) Applicant: Disney Enterprises, Inc., Burbank, CA (US)

(72) Inventors: Robert D. Schonfeld, Sherman Oaks, CA (US); Josiah Eatedali, Los Angeles, CA (US); Scott C. Hollestelle, Porter Ranch, CA (US)

(73) Assignee: Disney Enterprises, Inc., Burbank, CA (US)

( * ) Notice: Subject to any disclaimer, the term of this patent is extended or adjusted under 35 U.S.C. 154(b) by 184 days.

(21) Appl. No.: 13/745,612

(22) Filed: Jan. 18, 2013

(65) Prior Publication Data

US 2014/0205195 A1  Jul. 24, 2014

(51) Int. Cl.
*G06K 9/62* (2006.01)
*G06K 9/00* (2006.01)

(52) U.S. Cl.
CPC ................................. *G06K 9/00523* (2013.01)

(58) Field of Classification Search
None
See application file for complete search history.

(56) References Cited

U.S. PATENT DOCUMENTS

| 2009/0232354 A1* | 9/2009 | Camp et al. ................... 382/103 |
| 2013/0009994 A1* | 1/2013 | Hill .............................. 345/633 |
| 2013/0335310 A1* | 12/2013 | Whitney ....................... 345/156 |

OTHER PUBLICATIONS

Walmart Unveils Super Hero Augmented Reality App, posted Apr. 26, 2012, retrieved Jan. 7, 2013, <marvel.com/news/story/18623/walmart_unveils_super_hero_sugmented_reality_app>.

* cited by examiner

*Primary Examiner* — Aaron W Carter
*Assistant Examiner* — Siamak Harandi
(74) *Attorney, Agent, or Firm* — Patterson + Sheridan, LLP

(57) ABSTRACT

System, method, and computer program product to provide an augmented image, by receiving an image, analyzing the image to identify at least two augmentation triggers comprising: (i) a predefined object in the image, and (ii) a predefined landmark in the image, and generating an augmented image based on the analysis of the image, comprising affecting the predefined object with a retrieved augmentation image and adding a fictional character to the augmented image.

24 Claims, 4 Drawing Sheets

LANDMARK TRIGGERED IMAGE AUGMENTATION

BACKGROUND

1. Field of the Invention

Embodiments disclosed herein relate to the field of computer software. More specifically, embodiments disclosed herein relate to computer software which augments a photo to include one or more augmented reality effects.

2. Description of the Related Art

Currently, brick and mortar retailers need to encourage visits to their physical stores. Corporations selling products in these stores need ways to differentiate their product, drive interest in their brands, and encourage purchases of their products. What is lacking are new ways to encourage retail partners to place and keep corporate displays in retail stores.

SUMMARY

Embodiments disclosed herein provide a system, method, and computer program product to provide an augmented image, by receiving an image, analyzing the image to identify at least two augmentation triggers comprising: (i) a predefined object in the image, and (ii) a predefined landmark in the image, and generating an augmented image based on the analysis of the image, comprising affecting the predefined object with a retrieved augmentation image and adding a fictional character to the augmented image.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 1B:
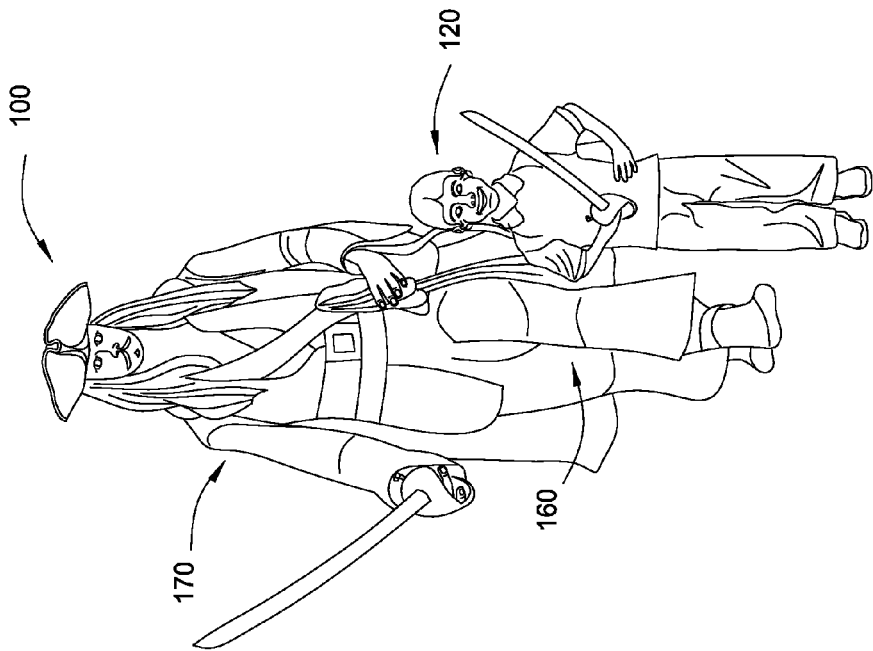
FIGS. 1A-B are illustrations of landmark triggered image augmentation, according to one embodiment disclosed herein.

Embodiments disclosed herein relate to the landmark triggered image augmentation, which may include an application for mobile computing devices (such as smart phones, tablets, and cameras) that allows users standing in a designated area of a retail store to take photographs with their favorite characters through the use of augmented reality. When a user is in a predetermined location in a retail store, such as near a kiosk with products or a cardboard cutout of a character, and the user is holding a predefined object, the landmark triggered image augmentation application will augment the a captured image (or video) of the user to include characters, videos, accessories, and other effects. The augmented images and videos may be viewed and saved to the user's device, emailed to the user, posted to a social media site of their choosing, or may be sent to an in-store photo center where the user may purchase a printed photograph.

Embodiments disclosed herein may use object detection technology to determine when a person posing for the photo is holding specific, predefined products, and which triggers the addition of augmented reality effects over those products. For example, when a consumer is taking a photo with an augmented reality representation of Mickey Mouse while holding the Fantasia Blu-ray, embodiments disclosed herein may overlay an image of Mickey's hat and wand in place of the Blu-ray. The image selected to be overlaid may be based on the object being held by the consumer, so when the consumer is holding a Fantasia video game, dancers from the game may be added to the image instead of Mickey's hat and wand. Embodiments disclosed herein encourage customers to physically interact with products to increase their enjoyment of the shopping experience (thus encouraging retail trips), and may encourage the customers to purchase the product they are holding.

In addition to adding characters and objects to the images and videos, the images and videos may be augmented to include movie trailers, video extras (e.g. outtakes), character movement and audio displayed on the user's device prior to taking the photograph, as well as provide the user special offers delivered through the application triggered by geolocation.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., the image processing application) or related data available in the cloud. For example, the image processing application could execute on a computing system in the cloud and augment photos captured by users. In such a case, the image processing application could augment the photos and store the augmented photos at a storage location in the cloud. Doing so allows a user to access this information from any computing system attached to a network connected to the cloud (e.g., the Internet).

The image processing application is used as a reference example for embodiments disclosed herein. The particular media properties used to illustrate embodiments disclosed herein are not intended to limit the scope of the disclosure, but are used to fully explain the reference example.

Figure 1A:
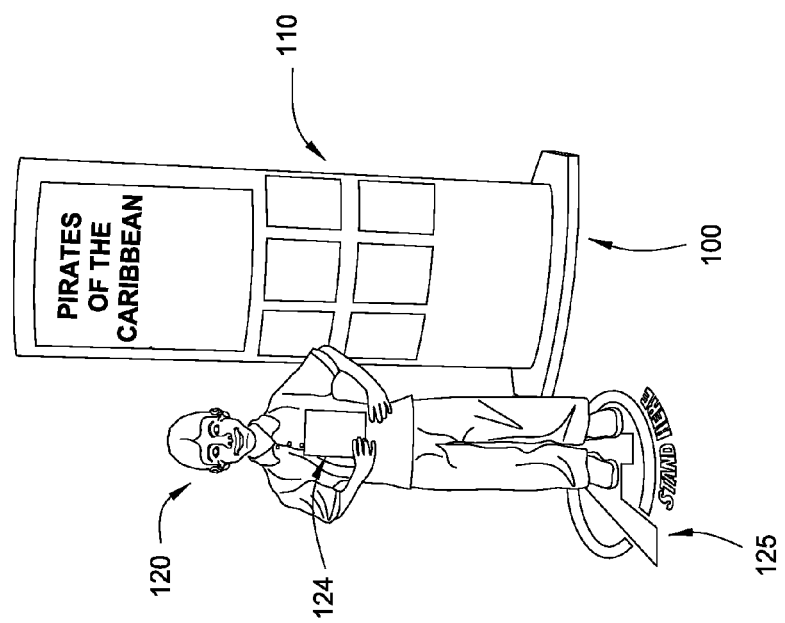

FIG. 1A is an illustration 100 of landmark triggered image augmentation, according to one embodiment disclosed herein. As shown, a child 120 is standing on a marker 125 in a section of a retail store. The child 120 is also standing next to a kiosk 110 which is branded with photographs of Disney characters, and holds a plurality of Disney branded products, such as movies and video games. The child 120 is holding a Disney media disc 121, which may be of any type of media format, including, but not limited to, a Blu-ray, a DVD, and a video game. The use of a media disc is exemplary and should be considered limiting of the disclosure. For example, the child could be holding a toy or other consumer product, which are contemplated by embodiments disclosed herein.

An image processing application may allow for the augmentation of a photo taken of the child 120. The image processing application may identify the kiosk 110 and the media disc 121, and augment the photo of the child 120. The image processing application may also use the marker 125 as an activation point, which, when detected, changes the UI of the application to include a border for a currently active property (such as Pirates of the Caribbean), to inform the user that the application is working correctly. The kiosk 110 may itself have an activation point (not pictured) which is used to trigger augmentation of the photo taken using the image processing application. The activation point on the kiosk 110 may be a QR code. Generally, any type of activation point may be used in any location. When the child 120 stands on the marker 125, the image processing application may overlay a scaled, three dimensional representation of a character in Pirates of the Caribbean, allowing for the capture of a photo with the child 120 and the representation of the Pirate. Once the photo is taken, the image may be stored to the user's device, emailed, uploaded to a social media page, or sent to the photo center in the retail store so a hard copy of the photo may be purchased.

In some embodiments, multiple kiosks 110 and markers 125 may be situated throughout a single retail store, or across different retail stores. In one embodiment, not all kiosks 110 and markers 125 are active, as different character franchises may be promoted at different times and dates. For example, the Pirates of the Caribbean kiosk 110 and marker 125 may be active, while in the same store, a kiosk 110 and marker 125 for Mickey Mouse may be inactive. A user may be sent messages (such as emails and SMS) indicating what character franchises are currently active and in which locations, or the image processing application itself may inform the user as to what is currently active, and in what particular retail store the kiosks 110 and markers 125 may be found. In addition, different characters within the character franchise may be active within a period of activity for the franchise. For example, Captain Jack Sparrow may be presented on Mondays, Wednesdays and Fridays, and Will Turner may be presented on Sundays, Tuesdays, Thursdays, and Saturdays during weeks when the Pirates of the Caribbean franchise is active.

In some embodiments, no kiosks are needed to trigger augmented reality effects and the image augmentation application may be used to directly interact with products. For example, the Pirates of the Caribbean marker, when viewed by the image processing application, may trigger an image of a movie theater which plays the trailer for the movie, fun facts or additional video content.

FIG. 1B is an illustration 100 of landmark triggered image augmentation, according to one embodiment disclosed herein. More specifically, the illustration 100 now depicts an image taken of the child 120 using the image processing application. As shown, the child 120 is now joined by a character 170, and the child 120 is holding a sword 160, which may be an item used by the character 170. The child no longer appears to be holding the media disc 121, as the sword 160 has been overlaid onto his hand. Although depicted as being replaced, the media disc 121 may be at least partially obscured by the sword 160. Additionally, the kiosk 110 is no longer included in the photo. In alternate embodiments, the augmented may remove an activation point included on the kiosk 110, but other portions of the kiosk 110 may remain visible. It should be appreciated by one of ordinary skill in the art that the sword 160 and the character 170 are merely exemplary, and that any combination of special effects may be superimposed onto the image 100. In addition, motion and music may be added, and several images or a video may be taken by the application.

Figure 2:
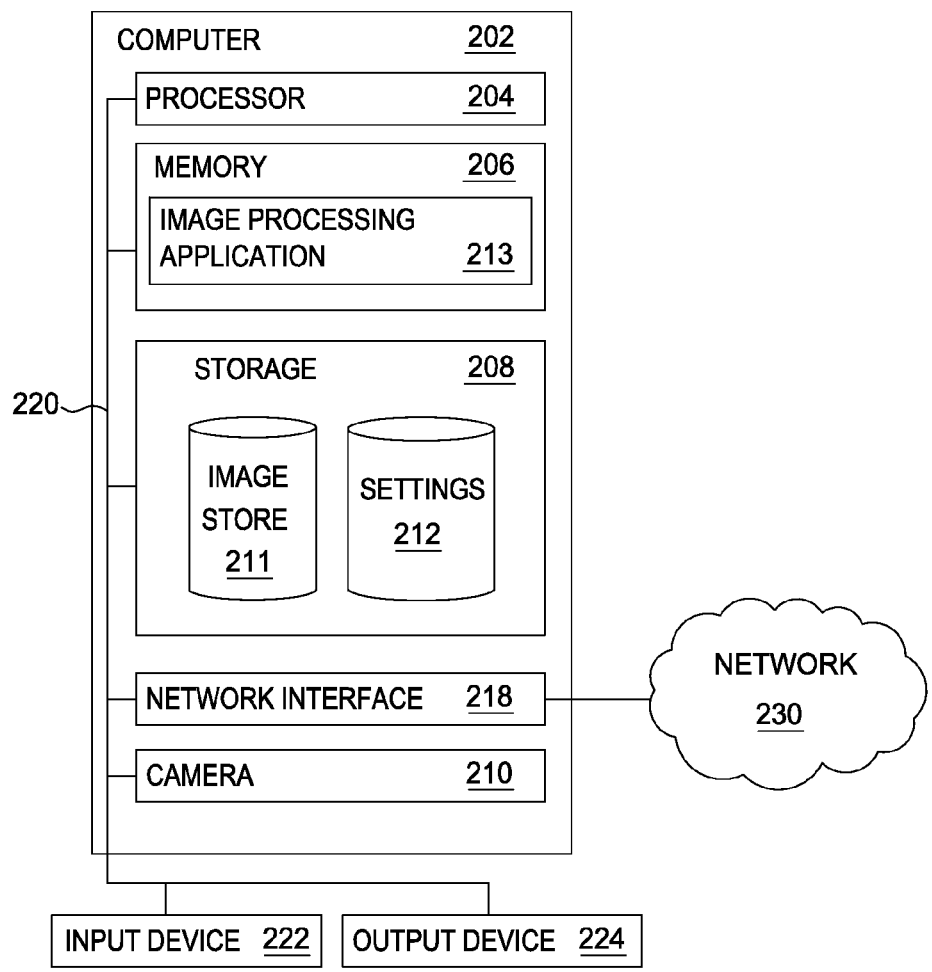
FIG. 2 is a block diagram illustrating a system for landmark triggered image augmentation, according to one embodiment disclosed herein.

FIG. 2 is a block diagram illustrating a system 200 for landmark triggered image augmentation, according to one embodiment disclosed herein. The networked system 200 includes a computer 202. The computer 202 may also be connected to other computers via a network 230. In general, the network 230 may be a telecommunications network and/or a wide area network (WAN). In a particular embodiment, the network 230 is the Internet.

The computer 202 generally includes a processor 204 connected via a bus 220 to a memory 206, a network interface device 218, a storage 208, an input device 222, and an output device 224. The computer 202 is generally under the control of an operating system (not shown). Examples of operating systems include the UNIX operating system, versions of the Microsoft Windows operating system, and distributions of the Linux operating system. (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both.) More generally, any operating system supporting the functions disclosed herein may be used. The processor 204 is included to be representative of a single CPU, multiple CPUs, a single CPU having multiple processing cores, and the like. Similarly, the memory 206 may be a random access memory. While the memory 206 is shown as a single identity, it should be understood that the memory 206 may comprise a plurality of modules, and that the memory 206 may exist at multiple levels, from high speed registers and caches to lower speed but larger DRAM chips. The network interface device 218 may be any type of network communications device allowing the computer 202 to communicate with other computers via the network 230.

The storage 208 may be a persistent storage device. Although the storage 208 is shown as a single unit, the storage 208 may be a combination of fixed and/or removable storage devices, such as fixed disc drives, solid state drives, floppy disc drives, tape drives, removable memory cards or optical storage. The memory 206 and the storage 208 may be part of one virtual address space spanning multiple primary and secondary storage devices.

As shown, the memory 206 contains the image processing application 213, which is an application generally configured to augment photos and videos of a user to include graphical representations of popular characters, additional product information, and special items. The image processing application 213 may utilize the camera 210 to capture an image, and may then augment the image with additional predefined graphics. The image processing application 213 may also be configured to process images already captured and stored in the storage 208, or image data coming from an image sensor of a camera. In the latter example, the image sensor data may be augmented and displayed on the screen of a computing device. The image processing application 213 may augment the image before or after it is captured by the camera 210. As shown, storage 208 contains an image store 211, which stores images, both augmented by the image processing application 213, and unaugmented images. The settings 212 (or the image store 211) may also include predefined images that may be used by the image processing application 213 to augment the images captured by the user. The storage 208 also includes a repository of settings 212, which function to manage a plurality of different features related to the image processing application 213. For example, the settings 212 may include statuses indicating the availability of different in-store experiences, whether they are active, and which characters from the different franchises are available. For example, if the kiosk or cutout is currently inactive, it may be marked as such in the settings 212, and the image processing application 213 will not augment any photos taken at that location. Additionally, the settings 212 may include information related to the location of different in-store experiences, products the users must hold to trigger the augmented reality effects, and the like. For example, the settings 212 may specify that a Pirates of the Caribbean DVD must be held at one location, while a video game must be held at a different location. Although depicted as a database, the image store 211 and settings 212 may take any form sufficient to store data, including text files, xml data files, and the like.

The camera 210 may be any camera suited to capture images or video via an image sensor. The input device 222 may be any device for providing input to the computer 202. For example, a keyboard and/or a mouse may be used. The output device 224 may be any device for providing output to a user of the computer 202. For example, the output device 224 may be any conventional display screen or set of speakers. Although shown separately from the input device 222, the output device 224 and input device 222 may be combined. For example, a display screen with an integrated touch-screen may be used.

In one embodiment, the computer 202 is a mobile computing device, such as a smartphone, tablet, laptop computer, or the like. The image processing application 213 may be a standalone application, or its functionality may be incorporated into another application, such as a custom application for a retailer whose stores host different landmark triggered image augmentation sites.

Figure 3:
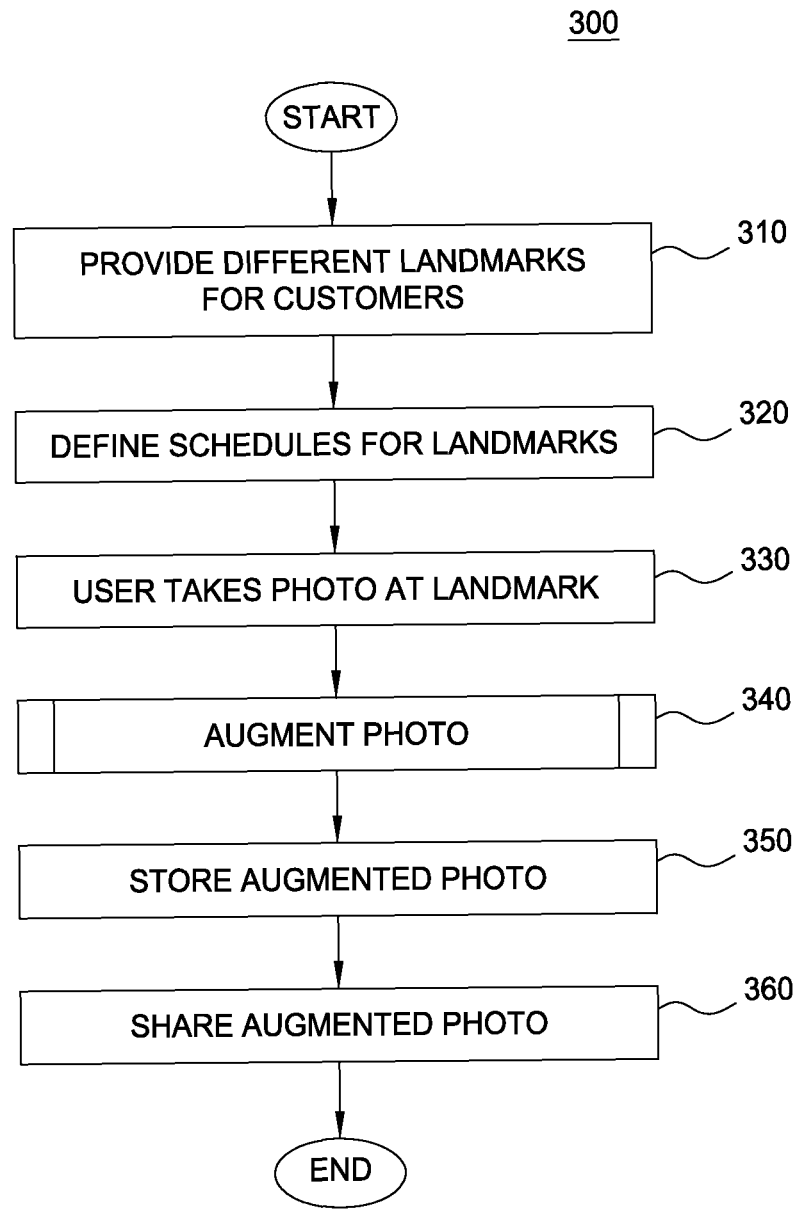
FIG. 3 is a flow chart illustrating a method for landmark triggered image augmentation, according to one embodiment disclosed herein.

FIG. 3 is a flow chart illustrating a method 300 for landmark triggered image augmentation, according to one embodiment disclosed herein. Generally, the steps of the method 300 allow a user to take a photo with their favorite characters, even though the characters are not present in the store. Additionally, the users will be provided with special effects, such as different toys, articles, and objects that they are not holding in reality. In one embodiment, some steps of the method 300 may be performed by the image processing application 213. At step 310, different landmarks are provided for customers in a variety of different retail stores. The landmarks may be specific to one franchise, such as Fantasia, Pirates of the Caribbean, Mickey Mouse, and the like. A retail store may have more than one landmark, which may be for a single franchise, or multiple franchises. The landmark may be any different number of objects, including but not limited to as a kiosk holding products and a cardboard cutout of a character. At step 320, schedules are defined for the different landmarks, which may be stored in the settings 212. In one embodiment, schedules for the different landmarks may be configured such that each landmark is active at all times. Alternatively, a more limited schedule of availability may be defined for one or more landmarks. Additionally, the schedules may define which characters from a given franchise are available at any given time. In one embodiment, all characters from the franchise are available, and the user may select one or more of the characters for inclusion in their photo. In another embodiment, less than all characters are available. For example, at a given moment in time, Goofy may be the only Disney character available at a Mickey Mouse landmark, and the image processing application 213 augments any photos taken at the landmark will include Goofy until the schedule for that landmark is changed accordingly.

At step 330, the user takes a photo at a particular landmark with their mobile computing device while executing the image processing application 213. The mobile computing device may be a smartphone, tablet, laptop computer, video game system, a camera, or a video camera, although any device with a camera capable of executing the image processing application 213 may be used. At step 340, the image processing application 213 augments the captured photo. In another embodiment, the image processing application 213 may augment the photo prior to the photo being captured, such that the captured image is already augmented. At step 350, the image processing application 213 stores the augmented photo to a storage device, such as the storage 208. At step 360, the user may share the augmented photo using the image processing application 213. For example, the user may specify to email the photo, send the photo as part of a multimedia message, or upload the photo to a website, a social media site, or a photo sharing website.

Figure 4:
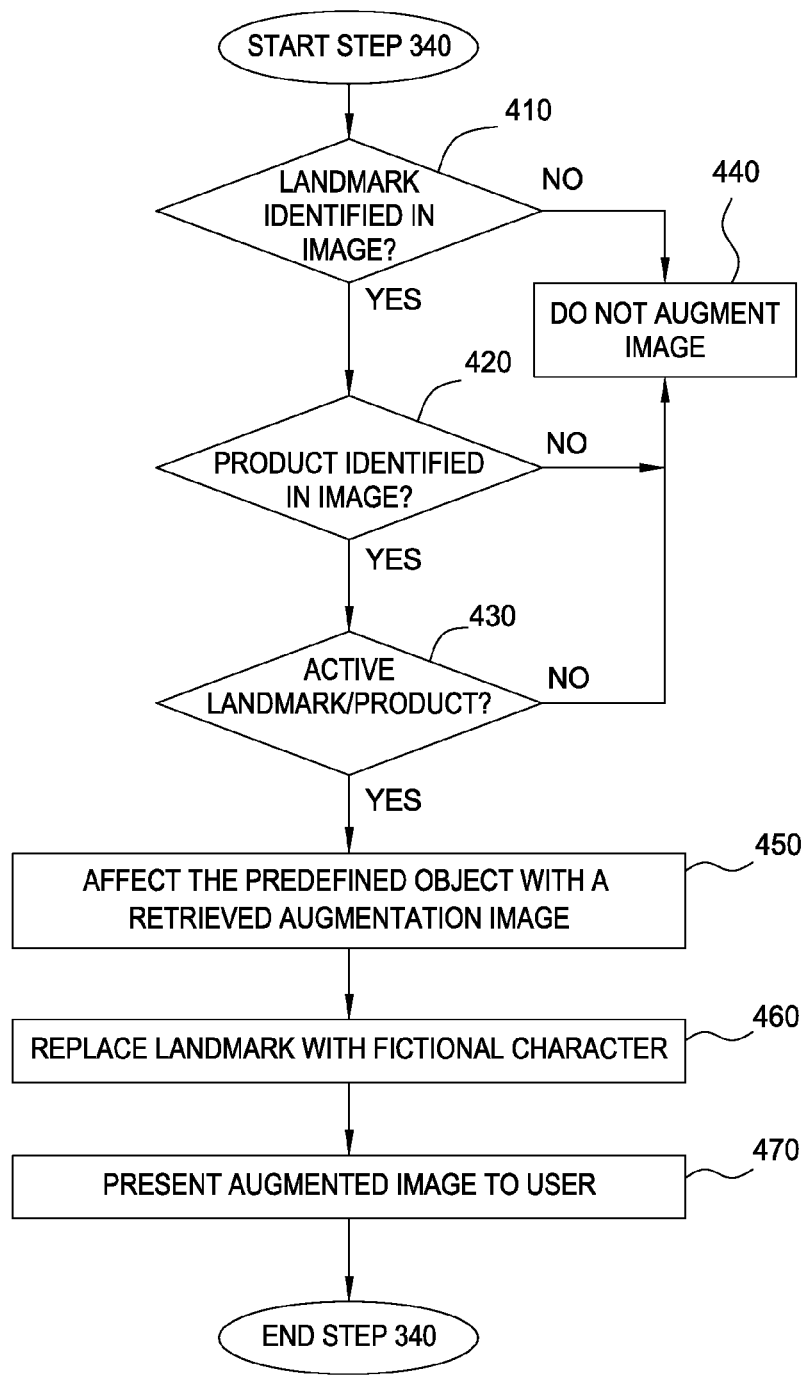
FIG. 4 is a flow chart illustrating a method to augment a photo, according to one embodiment disclosed herein.

FIG. 4 is a flow chart illustrating a method 400 to augment a photo, according to one embodiment disclosed herein. Augmenting the image may be initiated by detecting triggers in the image, and may include adding scale 3D models of popular characters, as well as different items associated with the characters, to the image. In one embodiment, the image processing application 213 performs the steps of the method 400. The augmenting of the image may occur prior to or after capturing the image via the camera 210. Although described from the perspective of augmenting an image, a plurality of images (or video frames) may be augmented, such that a video or image sequence is produced which has augmented reality. The augmented reality, although described herein with reference to image modifications, may also include motion of the still image characters, as well as sound effects and music.

At step 410, the image processing application 213 determines whether a predefined landmark is present in the image. The landmark may be a kiosk, cardboard cutout, QR code, or AR floor mat placed in a physical location, such as a retail store. The image processing application 213 may use any means to detect the predefined landmark, such as object detection technology. If the landmark is not identified in the image, the image processing application 213 proceeds to step 440. Otherwise, the image processing application 213 proceeds to step 420. At step 420, the image processing application 213 determines whether a predefined product is identified in the image. The predefined product information may be stored in the settings 212. The predefined product may be associated with a particular landmark, or plurality of landmarks. For example, a Pirates of the Caribbean Blu-ray disc may be defined as the predefined product for a first kiosk at a particular store. A second kiosk in the store may have a poster of a character in the movie as its predefined product. If the predefined product is detected in the image, using object detection technology, the image processing application 213 has now detected two triggers in the image, and proceeds to step 430. Otherwise, the image processing application 213 proceeds to step 440.

At step 430, the image processing application 213 determines whether the current landmark and product are active, i.e., whether augmented reality using the image processing application 213 may be used to augment the photo taken by the user. The image processing application 213 may reference scheduling data in the settings 212 for the landmark and product to determine whether the product and landmark are active. If both are active, the image processing application 213 may also retrieve information related to which characters may be used as an augmented reality overlay in the photo. For example, in the first week of a Fantasia kiosk promotion, Mickey Mouse may be selected as the character to add to the image. In the second week, the Donald Duck may be the currently active character. If the landmark or product is active, the image processing application 213 proceeds to step 430. Otherwise, the image processing application 213 proceeds to step 440. At step 440, the image is not augmented for any of a number of reasons. For example, the current landmark or property may not be active. Additionally, the predefined landmark or the predefined product may not be identified in the image. Since the image processing application 213 is intended to be used in specifically defined places, at specifically defined times, while the user is holding specifically defined products, the image processing application 213 will not augment images when all conditions are not met.

At step 450, all conditions have been met, and the image processing application 213 may affect the predefined object with a retrieved augmentation image. The augmentation image may be an item associated with a particular movie, video game, artist, celebrity, character, and the like. For example, a video disc may be replaced with a sword, shield, hook, hat, or other article associated with a character from the franchise. The augmentation image may be selected based on the predefined object being held by the customer. For example, if the user is holding a Blu-ray, augmentation image A may be provided. If the user is holding the video game, augmentation image B may be provided. Additionally, if the user holds a combination of items, a still different effect may be provided. For example, if the user is holding both the Blu-ray and video game, the image processing application 213 may provide augmentation image C. At step 460, the image processing application 213 may replace the landmark with a fictional character. In different embodiments, the landmark may continue to be partially or wholly visible. In another embodiment, the landmark may be in the same location as the landmark. In still another embodiment, the landmark may be removed, and the fictional character may be added to a different location in the image, preferably next to the user who is in the photo. For example, Mickey Mouse may be added to an image, while the Fantasia kiosk may be removed from the image. Any animated object may be selected for addition into the image, such as a car from the movie Cars, or a pirate from Pirates of the Caribbean. Both the fictional character and the augmentation image may be predefined and stored in the settings 212. Alternatively, they may be downloaded from the Internet or any other source. In one embodiment, the user may be presented with selection of a plurality of different fictional characters and different entities, which may be selected by the user for inclusion in their augmented image. At step 470, the augmented image is presented to the user.

Advantageously, embodiments disclosed herein reduce costs as compared to in-store events where people must be paid to appear in photos with users. The activation points may be small and unobtrusive, and utilize spaces that are not used to drive revenue (such as the side of a corrugate), and are more likely to be accepted by retail stores than larger physical displays. Additionally, the landmarks disclosed herein may be generic, such that they need not be replaced with every new release of a movie, video game, or the like. In addition, the effects may be changed and modified on the backend, and the changes flow through to all physical locations rather than needing to individually change each retail store. By augmenting photos only when a user is holding an object that is for sale, the user may be more likely to purchase the object. The user experience may be positive enough to encourage future visits where the user takes additional photos, and purchases additional products. By sharing the photos, friends and family of the user may also be encouraged to visit the retail store and take their own augmented reality photos or videos.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A computer-implemented method to augment an image, the method comprising:
   receiving the image;
   analyzing the image to identify at least two augmentation triggers comprising: (i) a predefined object in the image, and (ii) a predefined landmark in the image; and
   generating an augmented image responsive to identifying the predefined object and the predefined landmark in the image and by operation of one or more computer processors, wherein generating the augmented image comprises:
   affecting the predefined object with a retrieved augmentation image; and
   adding a fictional character to the augmented image.

2. The method of claim 1, wherein the predefined object is at least partially obscured by the augmentation image, wherein the predefined landmark is identified by an application, wherein the application is configured to independently identify each individual predefined landmark selected from a representation of: (i) a movie, (ii) a fictional character, (iii) a video game, and (iv) a musician, respectively.

3. The method of claim 2, wherein the application is configured to independently select, as the augmentation image, each individual entity selected from: (i) a depiction of a real world handheld object, and (ii) a depiction of a virtual hand held object;
   wherein the application is configured to independently add each individual fictional character selected from: (i) a movie character, (ii) a video game character, (iii) an animated character, and (iv) a television character.

4. The method of claim 3, wherein the predefined object is at least one of: (i) a tangible media containing a movie, (ii) a tangible media containing a musical album, (iii) a tangible media containing a video game, (iv) a toy, (v) a clothing item, and (vi) a tangible consumer product.

5. The method of claim 4, wherein the fictional character is absent from the image.

6. The method of claim 5, wherein the application is configured to transmit the augmented image to a recipient via at least one of (i) an email, (ii) a social media account, and (iii) an image sharing account.

7. The method of claim 6, further comprising providing a locator configured to output the nearest predefined landmark in response to receiving input describing a user's location.

8. The method of claim 7, further comprising, determining whether a status of the predefined landmark is active, wherein the predefined landmark comprises an indoor predefined landmark.

9. A computer program product to augment an image, the computer program product comprising:

a non-transitory computer-readable storage medium having computer-readable program code embodied therewith, the computer-readable program code comprising:
  computer-readable program code configured to receive an image;
  computer-readable program code configured to analyze the image to identify at least two augmentation triggers comprising: (i) a predefined object in the image, and (ii) a predefined landmark in the image; and
  computer-readable program code configured to generate an augmented image responsive to identifying the predefined object and the predefined landmark in the image, wherein generating the augmented image comprises:
    affecting the predefined object with a retrieved augmentation image; and
    adding a fictional character to the augmented image.

10. The computer program product of claim 9, wherein the predefined object is at least partially obscured by the augmentation image, wherein the predefined landmark is identified by an application, wherein the application is configured to independently identify each individual predefined landmark selected from a representation of: (i) a movie, (ii) a fictional character, (iii) a video game, and (iv) a musician, respectively.

11. The computer program product of claim 10, wherein the application is configured to independently select, as the augmentation image, each individual entity selected from: (i) a depiction of a real world handheld object, and (ii) a depiction of a virtual hand held object;
  wherein the application is configured to independently add each individual fictional character selected from: (i) a movie character, (ii) a video game character, (iii) an animated character, and (iv) a television character.

12. The computer program product of claim 11, wherein the predefined object is at least one of: (i) a tangible media containing a movie, (ii) a tangible media containing a musical album, (iii) a tangible media containing a video game, (iv) a toy, (v) a clothing item, and (vi) a tangible consumer product.

13. The computer program product of claim 12, wherein the fictional character is absent from the image.

14. The computer program product of claim 13, wherein the application is configured to independently transmit the augmented image via each medium selected from: (i) an email, (ii) a social media account, and (iii) an image sharing account.

15. The computer program product of claim 14, further comprising a locator configured to output the nearest predefined landmark in response to receiving input describing a user's location.

16. The computer program product of claim 15, further comprising determining whether a status of the predefined landmark is active, wherein the predefined landmark comprises an indoor predefined landmark.

17. A system, comprising:
  one or more computer processors; and
  a memory containing a program, which, when executed by the one or more computer processors, performs an operation to augment an image, the operation comprising:
    receiving the image;
    analyzing the image to identify at least two augmentation triggers comprising: (i) a predefined object in the image, and (ii) a predefined landmark in the image; and
    generating an augmented image responsive to identifying the predefined object and the predefined landmark in the image, comprising:
      affecting the predefined object with a retrieved augmentation image; and
      adding a fictional character to the augmented image.

18. The system of claim 17, wherein the predefined object is at least partially obscured by the augmentation image, wherein the predefined landmark is identified by an application, wherein the application is configured to independently identify each individual predefined landmark selected from a representation of: (i) a movie, (ii) a fictional character, (iii) a video game, and (iv) a musician, respectively.

19. The system of claim 18, wherein the application is configured to independently select, as the augmentation image, each individual entity selected from: (i) a depiction of a real world handheld object, and (ii) a depiction of a virtual hand held object;
  wherein the application is configured to independently add each individual fictional character selected from: (i) a movie character, (ii) a video game character, (iii) an animated character, and (iv) a television character.

20. The system of claim 19, wherein the predefined object is at least one of: (i) a tangible media containing a movie, (ii) a tangible media containing a musical album, (iii) a tangible media containing a video game, (iv) a toy, (v) a clothing item, and (vi) a tangible consumer product.

21. The system of claim 20, wherein the fictional character is absent from the image.

22. The system of claim 21, wherein the application is configured to independently transmit the augmented image via each medium selected from: (i) an email, (ii) a social media account, and (iii) an image sharing account.

23. The system of claim 22, further comprising a locator configured to output the nearest predefined landmark in response to receiving input describing a user's location.

24. The system of claim 23, further comprising determining whether a status of the predefined landmark is active, wherein the predefined landmark comprises an indoor landmark.

* * * * *